United States Patent Office 3,657,185
Patented Apr. 18, 1972

3,657,185
COPOLYMERS OF PHENYLINDAN DICARBOX-
YLIC ACID AND AN AROMATIC DIHYDROXY
COMPOUND
Robert L. Wear, West St. Paul, Minn., assignor to Minne-
sota Mining and Manufacturing Company, St. Paul,
Minn.
No Drawing. Filed Apr. 2, 1970, Ser. No. 25,254
Int. Cl. C08g 17/08, 33/10
U.S. Cl. 260—47 C
4 Claims

ABSTRACT OF THE DISCLOSURE

Polymers containing the esterified residue of phenyl-
indan dicarboxylic acid and an aromatic dihydroxy com-
pound may be solvent cast to provide films, are heat re-
sistant and have useful dielectric properties.

This invention relates to novel film-forming polymers
and their preparation and use. More specifically, the inven-
tion relates to polyester polymers having the recurring
unit

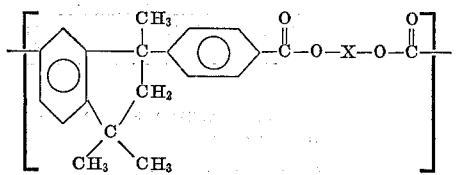

wherein X in each unit is a divalent aromatic radical free
of inhibiting and cross-linking substituents.

The structure will be seen to contain the esterified resi-
dues of a phenylindan dicarboxylic acid, namely 1,2,3-tri-
methyl-5-carboxy-3-(p-carboxyphenyl)indan or "PIDA,"
and an aromatic dihydroxy compound. The product is de-
sirably produced by a modified esterification mechanism
involving reaction between the dihydroxy compound and
the dicarboxylic acid chloride, or between the dicarboxyl-
ic acid and the acetylated dihydroxy compound, with elim-
ination of a small molecule other than water. The second
of these mechanisms is presently preferred due to the
acid chloride compound being commercially unavailable.
For convenience in the ensuing description, however, the
reaction and the reaction product will be considered to
involve the phenylindan dicarboxylic acid and the dihy-
droxyaromatic compound.

Phenylindan dicarboxylic acid is obtained as a white
free-flowing powder melting at 295° C. and having a mo-
lecular weight of 324.38. Its solubility, in grams/100 cc.
of solvent, is 36.7 in dimethylformamide and 15.1 in tetra-
hydrofuran. It has low solubility in water, xylene and car-
bon tetrachloride. Properties of the acid have been de-
scribed in Bulletin PD-1A published by Amoco Chemi-
cals Corp., 130 E. Randolph Drive, Chicago, Ill.

The aromatic dihydroxy compound can contain one
or more aromatic rings and these rings may be separated
by an aliphatic moiety. The aromatic dihydroxy com-
pounds always contain a terminal aromatic group and the
hydroxyl groups are always present on the aromatic rings.
These PIDA coreactants are primarily aromatic, i.e., a
major proportion of the carbon present is within an aro-
matic ring. Also, if the hydroxyls are on the same ring,
they are attached to ring carbons which are separated by
at least two other ring carbons. While the rings may con-
tain other substituents, they must be free of branched alkyl
radicals which sterically inhibit the esterification reaction
and also free of radicals which provide readily reactive
sites for cross-linking such as hydroxyl or primary or sec-
ondary amino radicals. Classes of aromatic dihydroxy
compounds which meet the above criteria and are useful
in the practice of this invention include the dihydroxy
benzenes such as hydroquinone, compounds having fused
aromatic rings such as 1,5 dihydroxynaphthalene, com-
pounds containing di(hydroxy phenyl) groups separated
by a branched aliphatic chain such as bisphenol A, com-
pounds having di(hydroxy phenyl) groups separated by a
linear aliphatic chain such as 1,2-di(hydroxy phenyl)
ethane and compounds with di(hydroxy phenyl) groups
separated by a hetero atom or hetero aliphatic moiety
such as 4,4'-sulfonyldi-o-cresol.

The presently preferred method for producing the co-
polymers of this invention involves the initial step of re-
acting the aromatic dihydroxy compounds with an acetyl-
ating agent to produce the di(acetic acid ester). The di-
acetylated aromatic compound is then reacted with an
equimolar amount of PIDA in a suitable high boiling sol-
vent, e.g., "Aroclor 1232," a chlorinated diphenyl contain-
ing about 32% chlorine. The reaction is carried out at a
temperature of 260–290° C. and preferably, although not
necessarily, in the presence of a catalyst, e.g., sodium ace-
tate, to increase the rate of reaction. Acetic acid is given
off during the reaction and it can be collected and meas-
ured to indicate the rate of reaction.

The polymeric reaction product thus formed is char-
acterized by the recurring chain structure:

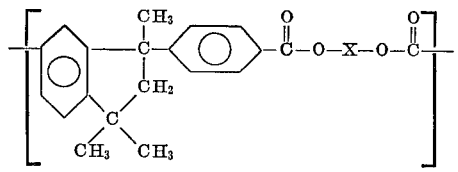

where X is a divalent aromatic radical free of inhibiting
or cross linking substituents.

A second stage or solid state polymerization can be used
to increase the degree of polymerization of the first stage
reaction product by heating at 260–290° C. in an inert
atmosphere, e.g., in a current of dry nitrogen. The degree
of polymerization is measured by the inherent viscosity
of the polymer as described below.

Viscosity measurements were performed on a Series
100 Cannon Fenske Viscometer in the manner indicated
below. This viscometer is basically a U-tube designed to
give relative viscosity measurements which are deter-
mined by measuring the time taken for the solution to
flow past a delineated segment in the tube and dividing
this by the time taken for an identical volume of the pure
solvent used to make the solution. The inherent viscosity
of the solution is then calculated by the following equa-
tion:

$$\text{Inherent Viscosity} = \frac{\text{natural log of relative viscosity}}{\text{wt. in grams 100 ml. of sol'n.}}$$

The procedure for obtaining relative viscosity data was
as follows. First, a sample of the solvent, i.e., 1,1,2,2-tetra-
chloroethane was placed in the clean, dry viscometer
which had been held at 30° C. The solvent was retained
in the viscometer for 10 minutes to attain temperature equilibrium at 30° C. with the device. The measurement of flow rate was then taken. Next the process was repeated with a solution containing 0.25 gm. of polymer/ 50 ml. of solvent and the relative viscosity was calculated as indicated above. This procedure was repeated five times and the average of these relative viscosity measurements was used to calculate inherent viscosity according to the formula shown above.

While satisfactory films may be cast from polymers having an inherent viscosity of from 0.4 to 1.4 depending upon the particular polymer, it is generally preferred to use polymers having inherent viscosities of about 0.6 to 1.1. Polymers having higher inherent viscosity values form more viscous solutions with casting solvents and are, therefore, more difficult to cast into films while polymers having very low inherent viscosity values provide films of lower mechanical strength than comparable films of higher viscosity.

Films made from the copolymers of the reaction products of hydroquinone with PIDA, bisphenol A with PIDA and copolymers made from the mixed reaction product of hydroquinone and bisphenol A with PIDA have especially interesting properties. These films may be used to make metalized film capacitors with dielectric constant values comparable to polyethylene terephthalate containing capacitors and they also have good mechanical properties at high temperatures. These polymers may also be pressed at temperatures of 320–360° C. to produce tough, transparent thermoplastic sheets.

The polymer made from hydroquinone can, surprisingly, be readily obtained in the amorphous state. Generally, aromatic polymers made from hydroquinone are highly crystalline and are very highly insoluble in most solvents. Solvent casting of films from these polymers, therefore, is exceedingly difficult. Because the PIDA polymer made with hydroquinone is amorphous, films of the polymer may be readily cast out of a variety of common organic solvents.

Examples of the product of this invention follow. These examples are designed to illustrate the wide variety of coreactants useful for practicing the teachings of this invention as well as to provide an indication of the properties of some of these polymers. It should be noted that in all examples, PIDA is reacted in equimolar proportions with the diacetylated ester of the aromatic dihydroxy compounds.

EXAMPLE 1

64.88 gms. of PIDA, 38.84 gms. of the diacetylated ester of hydroquinone, hereinafter hydroquinone diacetate, 180 gms. of "Aroclor 1232" and 0.2 gm. of sodium acetate were placed in a 500 ml. flask equipped with a stirrer, nitrogen inlet, thermometer and distillation assembly. The mixture was heated in the flask in an oil bath for 7 hours and 50 minutes under a nitrogen gas atmosphere as follows. It took 42 minutes to raise the temperature inside the flask to 240° C. After 18 additional minutes, the temperature was raised to 270° C. and maintained between 270 and 281° C. for the remainder of the process. After one hour and 15 minutes, nitrogen was bubbled below the surface of the reaction mixture. At this time a slow, continual increase in viscosity was noted which continued until the heating was completed.

The viscous solution was allowed to cool and repeatedly decanted with boiling acetone which precipitated the polymer. The white polymeric powder was then collected by filtration. The inherent viscosity was 0.35.

The polymeric powder remaining was subjected to a second stage polymerization by maintaining it in a nitrogen atmosphere for 4 hours at 285° C. and passing the nitrogen through the polymeric powder. The inherent viscosity was 0.978 after completion of this second stage polymerization.

The polymer was then dissolved in tetrachloroethane by heating on a steam bath to 90° C. to produce a moderately viscous solution containing 15% polymer by weight. The solution was knife coated on a temporary support of polyethylene terephthalate film to a wet thickness of 15 mils (0.380 mm.), the solvent was driven off in a hot air oven and the cast film stripped from the support. The resulting film was smooth, flexible and transparent. The same coating procedure, wet coating thickness, and polymer concentrations in the cast solvent were used in subsequent examples unless otherwise indicated.

EXAMPLE 2

A polymer was prepared from equimolar proportions of PIDA and diacetylated hydroquinone and inherent viscosity measurements were taken as previously indicated. The process time for the first heating step was 6 hours and the temperature was increased to 270° C. during the first 40 minutes and maintained between 270° C. and 280° C. for the balance of this heating step. The inherent viscosity after this heating step was 0.40. The second stage solid state polymerization was conducted at 280° C. for 4 hours and the inherent viscosity of the polymer was thereby increased to 0.91. A film was cast out of chlorobenzene and after the solvent was removed, the film was subjected to a series of mechanical tests.

Tensile strength was measured as outlined in ASTM Method D 822 except that the strain rate was 0.02 inch/ min. (0.508 mm./min.). The tests were performed at the temperatures outlined in the table below.

TABLE I

| Test temperature | Tensile strength (p.s.i.) | Elongation, percent |
|---|---|---|
| Room temperature | $10.7 \times 10^3$ | 14 |
| 260° C. (500° F.) | $2.5 \times 10^3$ | 46 |

Percent elongation was measured at break and is defined by the following formula:

$$\frac{\text{length of the sample at break} \times 100}{\text{original length}}$$

Three separate flex tests were performed on the film to determine its durability at 220° C., 250° C., and 300° C. The procedure was as follows. Several 2.54 cm. x 12.7 cm. samples were suspended vertically in a forced air circulating oven set at the test temperature with a paper clip attached to the bottom end to prevent curling. Periodically, three samples were removed and tested as follows. The samples were allowed to cool for from 3 to 5 minutes and then folded lengthwise using finger pressure to make a crease. Cracking along the crease indicates failure. If no failure occurred in the samples, they were then unfolded and folded at three places along the crosswise axis for each sample. If cracking appeared along any axis lines of any sample, the film failed the test.

The results of the tests are summarized in the table below:

TABLE II

| Hold temperature, ° C.: | Hours to cracking |
|---|---|
| 220 | >72 |
| 250 | >19 |
| 300 | 6 |

Further indications of high temperature stability are indicated by Thermal Gravimetric Analysis (TGA) and Differential Thermal Analysis (DTA). (These tests are described in High Temperature Resistant Polymers, by A. H. Frazer, Interscience Publishers, New York, N.Y., 1968, pp. 25–28.) TGA analysis showed a weight loss of 10% at 450° C. indicating good thermal stability and DTA indicated a glass transition temperature of 260–280° C.

A very simple test was then performed to provide a graphic demonstration of the elevated temperature strength of this example. A frozen waffle was packaged in a bag of PIDA:hydroquinone film of this example and heat sealed. A second identical waffle was packaged in a bag made of polyethylene terephthalate and sealed. After these frozen waffles were placed in a toaster, and quickly heated to serving temperature, no damage to the bag made of the polymer of this example was noted but severe localized melting was noticed in the polyethylene terephthalate film. This example illustrates that a film of the polymer of this example can also be used as a cooking package for frozen foodstuffs. The film can be used by itself or may be attached to a semi-rigid supporting member such as an aluminum tray.

EXAMPLE 3

This example illustrates the esterification of PIDA with the diacetic acid ester of bisphenol A.

31.24 gms. of diacetylated bisphenol A was combined with 32.44 gms. of PIDA, 0.1 gm. of sodium acetate, and 100 gms. of "Aroclor 1232" as in the preceding examples. After 25 minutes undissolved solids were present even though the vessel had reached a temperature of 206° C. After 20 more minutes the temperature increased to 240° C., and the solids were dissolved. The total process time for the heating was 6 hours and 50 minutes and the temperature of the reaction mixture generally conformed to the pattern as indicated in Example 1. After 2 hours and 45 minutes nitrogen gas was pumped in below the surface and the viscosity increased from that time until the end of the process. When acetone was added, no precipitate was formed and the mixture remained in the highly viscous state. The entire mixture was then diluted with trichloroethylene and heated on a steam bath. The polymer was precipitated as a white fibrous mass by pouring into methyl alcohol in a blender. The mass was then redissolved in dichloromethane and again precipitated in methyl alcohol in a blender. First stage inherent viscosity measurements produced a value of 0.62. The polymer was subjected to solid state polymerization under the conditions used in Examples 1 and 2 except that the polymerization was carried out at 260° C. instead of 285° C. Second stage polymerization produced an inherent viscosity of 1.42. The second stage polymer was cast out of chlorobenzene using the polymer-solvent proportions of Example 1 and the film was flexible and transparent.

The film was subjected to a series of physical tests using the procedures indicated in Example 2. The results of these tests were as follows:

TABLE III

| Test: | Value |
| --- | --- |
| Tensile strength (room temp.) | $11.2 \times 10^3$ p.s.i. |
| Elongation (room temp.) | 12% |
| Flex test (hours to cracking at 300° C.) | 2 |

These data show similar but not quite comparable high temperature stability to that of the polymer of Example 2.

34.96 gms. of diacetylated hydroquinone, 6.24 gms. of diacetylated bisphenol A, 64.88 gms. of PIDA, 0.2 gm. of sodium acetate and 180 gms. of "Aroclor 1232" were added to the vessel used in the preceding examples, providing a ratio of 0.09 mole of hydroquinone diacetate and 0.01 mole of bisphenol A diacetate to 0.10 mole of PIDA. The total heating time was 8 hours. After the first heating step was complete, the residue was treated as in Example 1 except that many more treatments with acetone were needed to form the precipitate. The inherent viscosity after this stage was found to be 0.508. The polymer was then subjected to solid state polymerization at 283° C. for 3 hours, after which the inherent viscosity was 0.952. Twenty gms. of polymeric precipitate was dissolved in 80 gms. chlorobenzene and cast into a film which was flexible and generally similar to the films cast from the paraphenylene:PIDA polymer.

Physical tests were performed on this film as indicated below:

TABLE IV

| Test: | Value |
| --- | --- |
| Tensile strength (room temp.), p.s.i. | $9.0 \times 10^3$ |
| Elongation (room temp.), percent | 10 |
| Flex test (hours to cracking at 300° C.) | 6 |

It is possible fairly consistently to attain values for inherent viscosity of 0.6 or better as a result of the first stage polymerization of this polyester. Such polymer form, films may be cast having properties similar to those films which were cast from Examples 2 and 3 polymers which had been subjected to solid state polymerization.

EXAMPLE 5

16.22 gms. of PIDA was reacted with 18.2 gms. of the di(acetic acid ester) of 4,4'-sulfonyldi-o-cresol, heating the mixture as in the earlier examples for 6 hours. Nitrogen gas was bubbled below the surface after 1 hour and 50 minutes, producing a slow steady increase in viscosity which continued until 45 minutes prior to the end of the heating step. A stiff gum was formed after extraction hot acetone and ground in a blender with methanol. The resulting solid was left in methanol for 16 hours, the methanol removed by filtration and the polymer was then washed with methanol. The polymer at this stage was lumpy and amorphous and its inherent viscosity was 0.51. A film was cast using a solution of 10 gms. of the polymer in 50 ml. of trichloroethylene. After the solvent evaporated, a film ranging from 1–10 mils thick remained. Where the dried film was the thinnest, i.e., between 1 and 3 mils, it was flexible but as the film approached 10 mils it become increasingly brittle.

The remainder of the polymer was precipitated out of methanol in the blender and part of the remainder was pressed at 300° C. to produce a clear, bubble-free somewhat brittle film.

The balance of this remainder was subjected to solid state polymerization for 3.5 hours at 280° C. The inherent viscosity of the solid state film was 0.75 and a film was solvent cast in the same manner as the first stage film with the same apparent physical character. This material will make a protective coating for sheet metals.

EXAMPLE 6

A polymer was prepared from PIDA and diacetylated naphthalene 1,5 diol using 0.10 mole of each reactant and generally following the procedures of the previous examples. After 20 minutes the vessel temperature was 227° C., and after 2 hours, 265° C. Temperature was maintained between 265° C., 257° C. for the balance of this step and the entire first stage heating requiring 5 hours and 40 minutes. After 1.5 hours nitrogen gas was bubbled under the surface of the reaction mixture and at about that time a gradual increase in viscosity was noted. After heating was complete and the polymer cooled and extracted with hot acetone, the polymer was in the form of a rubbery gummy mass. The mass was ground with methanol in a blender and filtered, yielding a somewhat chunky solid. The polymer, which had an inherent viscosity of 0.68, was cast out of chlorobenzene solution as in the earlier samples to produce a clear film somewhat less brittle than the sulfonyl film but less flexible than the films made from hydroquinone and bisphenol A.

EXAMPLE 7

Tests were run on the polymers of Examples 2, 3, and 4 as shown in Tables V, VI, and VII, respectively, to illustrate the use in electrical applications. The properties measured were the dielectric constant (K), which is the ratio of the capacitance of the test material to the capacitance of air in a capacitor construction, and the dissipation factor (tan $\delta$) which provides an indication of the amount of electrical energy changed to heat.

A circular sample of the polymer having a diameter of 2.54 cm. and a thickness of 0.0229 mm. was metallized and tested according to the ASTM D-150-68 standard. The results of these tests for each of the polymers are indicated in the table below, the dissipation factor being multiplied ×100 in each case to convert it to a percentage value.

TABLE V.—HYDROQUINONE:PIDA

| Temp., °C. | Frequency | | | | | |
|---|---|---|---|---|---|---|
| | 1 kHz. | | 10 kHz. | | 100 kHz. | |
| | K | Tan δ (percent) | K | Tan δ (percent) | K | Tan δ (percent) |
| 23 | 3.91 | .41 | 3.88 | 1.01 | 3.81 | 2.03 |
| 50 | 3.85 | .26 | 3.84 | .49 | 3.80 | 1.34 |
| 75 | 3.85 | .22 | 3.84 | .32 | 3.82 | .82 |
| 100 | 3.87 | .24 | 3.86 | .25 | 3.85 | .56 |
| 125 | 3.89 | .29 | 2.88 | .25 | 3.87 | .55 |
| 150 | 3.90 | .34 | 3.88 | .62 | 3.87 | .50 |
| 175 | 3.90 | .51 | 3.88 | .90 | 3.87 | .64 |
| 200 | 3.89 | .81 | 3.87 | .63 | 3.86 | 1.32 |

TABLE VI.—BISPHENOL A:PIDA

| Temp., °C. | Frequency | | | | | |
|---|---|---|---|---|---|---|
| | 1 kHz. | | 10 kHz. | | 100 kHz. | |
| | K | Tan δ (percent) | K | Tan δ (percent) | K | Tan δ (percent) |
| 75 | 3.57 | .59 | 3.54 | .64 | 3.51 | .86 |
| 125 | 3.58 | .27 | 3.56 | .46 | 3.53 | .68 |
| 150 | 3.48 | .30 | 3.47 | .46 | 3.44 | .82 |
| 175 | 2.86 | 1.27 | 2.83 | .64 | 2.80 | 1.61 |

TABLE VII.—MIXED COPOLYMER

| Temp., °C. | Frequency | | | | | |
|---|---|---|---|---|---|---|
| | 1 kHz. | | 10 kHz. | | 100 kHz. | |
| | K | Tan δ (percent) | K | Tan δ (percent) | K | Tan δ (percent) |
| 23 | 3.55 | .55 | 3.51 | 17.3 | .43 | 2.29 |
| 50 | 3.52 | .31 | 3.50 | .64 | 3.46 | 1.54r |
| 75 | 3.52 | .22 | 3.51 | .38 | 3.49 | 1.00 |
| 100 | 3.51 | .16 | 3.50 | .25 | 3.49 | .75 |
| 125 | 3.52 | .14 | 3.51 | .19 | 3.50 | 1.03 |
| 150 | 3.51 | .13 | 3.51 | .17 | 3.50 | .62 |
| 175 | 3.54 | .18 | 3.54 | .17 | 3.53 | .48 |
| 200 | 3.53 | 2.55 | 3.52 | 1.28 | 3.52 | 2.04 |

These data are virtually identical to those obtained with polyethylene terephthalate-containing capacitors and therefore, these films can readily be used instead of polyethylene terephthalate films as dielectrics in capacitors or for similar uses. The previously mentioned superior heat resistance of polymer films of the invention also permits them to be used at temperatures higher than polyethylene terephthalate film can tolerate.

The preceding examples are illustrative of the scope of the teachings and the presently preferred embodiments of this invention. Variations will readily suggest themselves to those skilled in the art such as the substitution of small amounts of other aromatic dibasic acids for part of the PIDA. When substitution is at low levels, it will not alter the solubility of the polymer in organic solvents or its amorphous structure.

What is claimed is:

1. A film-forming polyester polymer consisting essentially of the recurring unit

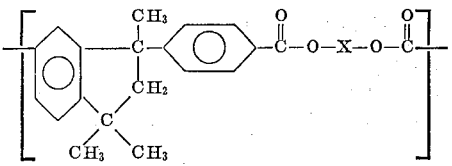

where X in each unit is a divalent radical containing at least one aromatic ring free of inhibiting and cross-linking substituents selected from the group consisting of

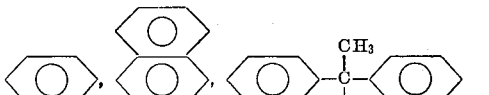

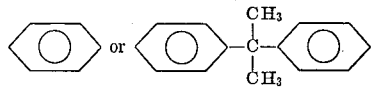

where y is H or $CH_3$.

2. The product of claim 1 in which the polymer is in film form.

3. The product of claim 2 in which the film is flexible, X is

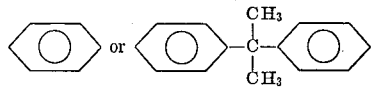

and the polymer has an inherent viscosity in the range of 0.4 to 1.4 when measured in a 1,1,2,2-tetrachloroethane solution containing 0.25 gm. polymer/50 ml. of solution.

4. The product of claim 3 wherein the inherent viscosity of the polymer is in the range of 0.6 to 1.1.

References Cited

UNITED STATES PATENTS 2,873,262  2/1959  Petropoulos _____ 260—22
3,522,215  7/1970  Sardessai et al. __ 260—47 C X
3,535,286  10/1970  Deeken et al. _____ 260—75

OTHER REFERENCES

Fibres From Synthetic Polymers, Hill, pp. 210 and 211, Elsevier Publishing Co., New York, N.Y., published 1953.

HOWARD E. SCHAIN, Primary Examiner

U.S. Cl. X.R.

99—192 P; 117—128.4, 132 C, 161 K, 218, 227, 230; 260—33.8 R

UNITED STATES PATENT OFFICE
CERTIFICATE OF CORRECTION

Patent No. 3,657,185　　　　　　　Dated　Apr. 18, 1972

Inventor(s)　Robert L. Wear

It is certified that error appears in the above-identified patent and that said Letters Patent are hereby corrected as shown below:

Column 7, Table V. under heading "10 kHz. K" -- 2.88 -- should be "3.88".

Signed and sealed this 28th day of January 1975.

(SEAL)
Attest:

McCOY M. GIBSON JR.　　　　　　C. MARSHALL DANN
Attesting Officer　　　　　　　　Commissioner of Patents